United States Patent
Feng et al.

(12) 
(10) Patent No.: US 8,057,778 B2
(45) Date of Patent: Nov. 15, 2011

(54) METHOD AND APPARATUS FOR FORMING CARBON NANOTUBE ARRAY

(75) Inventors: Chen Feng, Beijing (CN); Liang Liu, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 0 days.

(21) Appl. No.: 12/855,883

(22) Filed: Aug. 13, 2010

(65) Prior Publication Data

US 2011/0142745 A1    Jun. 16, 2011

(30) Foreign Application Priority Data

Dec. 11, 2009   (CN) .......................... 2009 1 0 250643

(51) Int. Cl.
*D01F 9/12* (2006.01)
*B01J 19/00* (2006.01)

(52) U.S. Cl. .................. 423/447.3; 423/447.1; 422/198; 977/742; 977/843

(58) Field of Classification Search ............... 423/447.1, 423/447.2, 447.3; 422/198; 977/742, 843
See application file for complete search history.

(56) References Cited

U.S. PATENT DOCUMENTS

| | | | |
|---|---|---|---|
| 4,263,872 A * | 4/1981 | Ban ............................... | 118/721 |
| 7,045,108 B2 | 5/2006 | Jiang et al. | |
| 2004/0151835 A1 * | 8/2004 | Croci et al. ................ | 427/249.1 |
| 2005/0170089 A1 * | 8/2005 | Lashmore et al. ......... | 427/248.1 |
| 2007/0292614 A1 * | 12/2007 | Liu et al. .................... | 427/249.1 |
| 2008/0152554 A1 * | 6/2008 | Kim et al. .................... | 422/187 |
| 2008/0248235 A1 | 10/2008 | Feng et al. | |

* cited by examiner

*Primary Examiner* — Daniel C. McCracken
(74) *Attorney, Agent, or Firm* — Altis Law Group, Inc.

(57) ABSTRACT

The present disclosure relates to a method for forming a carbon nanotube array. In the method a tubular substrate is provided. The tubular substrate includes an outer sidewall with a catalyst layer located on the outer sidewall. The heating member, and the tubular substrate with the catalyst layer is received in a reacting chamber. The tubular substrate is heated by the heating member. A carbon source gas is supplied into the reacting chamber to grow the carbon nanotube array on the tubular substrate.

20 Claims, 3 Drawing Sheets

--- providing a tubular substrate comprising an outer sidewall with a catalyst layer located on the outer sidewall

↓ receiving a heating member, and the tubular substrate with the catalyst layer in a reacting chamber

↓ heating the tubular substrate by the heating member

↓ supplying a carbon source gas into the reacting chamber to grow the carbon nanotube array on the tubular substrate

METHOD AND APPARATUS FOR FORMING CARBON NANOTUBE ARRAY

CROSS-REFERENCE TO RELATED APPLICATIONS

This application claims all benefits accruing under 35 U.S.C. §119 from China Patent Application No. 200910250643.0, filed on Dec. 11, 2009, in the China Intellectual Property Office, the disclosure of which is incorporated herein by reference. This application is related to commonly-assigned applications entitled, "METHOD FOR MAKING CARBON NANOTUBE FILM", Ser. No. 12/856,541, filed on Aug. 13, 2010; "METHOD FOR MAKING CARBON NANOTUBE STRUCTURE", Ser. No. 12/855,875, filed on Aug. 13, 2010; "METHOD FOR MAKING CARBON NANOTUBE STRUCTURE", Ser. No. 12/855,879, filed on Aug. 13, 2010.

BACKGROUND

1. Technical Field

The present disclosure relates to a method and apparatus for forming a carbon nanotube array.

2. Description of Related Art

A carbon nanotube array is grown on a flat silicon wafer by using a chemical vapor deposition (CVD) method. More specifically, a layer of nanosized catalyst grains is arranged on the flat silicon wafer by annealing a metal film deposited on the wafer. Then the wafer is disposed and heated in a reactor chamber. Carbon source gas and protective gas are introduced into the reactor chamber and the carbon source gas is pyrolyzed by an action of the catalyst grains at elevated temperature to grow the carbon nanotube array on the flat silicon wafer. However, the size of the carbon nanotube array grown on the flat silicon wafer is restricted by the size of the reactor chamber.

Recently, a method for growing a large-area carbon nanotube film is disclosed by the patent application US20070292614 A1 to Liu et al. The method includes steps of: providing a cylinder shaped substrate; forming a catalyst layer on the outer surface of the cylinder shaped substrate; fixing the cylinder shaped substrate in a reactor chamber; and growing a carbon nanotube film on the outer surface of the cylinder shaped substrate by the CVD process. The silicon wafer and the cylinder shaped substrate with the same diameter that can be accommodated by the same reactor chamber, can have different surface area that has the carbon nanotubes grown thereon, wherein the outer surface of the cylinder shaped substrate is larger than the flat surface of the silicon wafer. Therefore, a larger carbon nanotube film can be achieved by using the cylinder shaped substrate but not to increase the size of the reactor chamber, especially not increase a diameter of a tube furnace.

However, in the above method, the reactor chamber is heated to 700° C. by resistance wires coiled outside the reactor chamber, to indirectly heat the cylinder shaped substrate thereby pyrolyzing the carbon source gas. When the carbon nanotubes have been grown on the outer surface of the cylinder shaped substrate, an amount of heat is absorbed by the carbon nanotubes to slow down the heating speed of the substrate and the growing speed of the carbon nanotubes. As the increasing of the height of the carbon nanotubes, the growing speed of the carbon nanotubes becomes slower.

What is needed, therefore, is to provide a method and an apparatus for forming a carbon nanotube array at a quickly growing speed.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "another", "an", or "one" embodiment in this disclosure are not necessarily to the same embodiment, and such references mean at least one.

Figure 1:
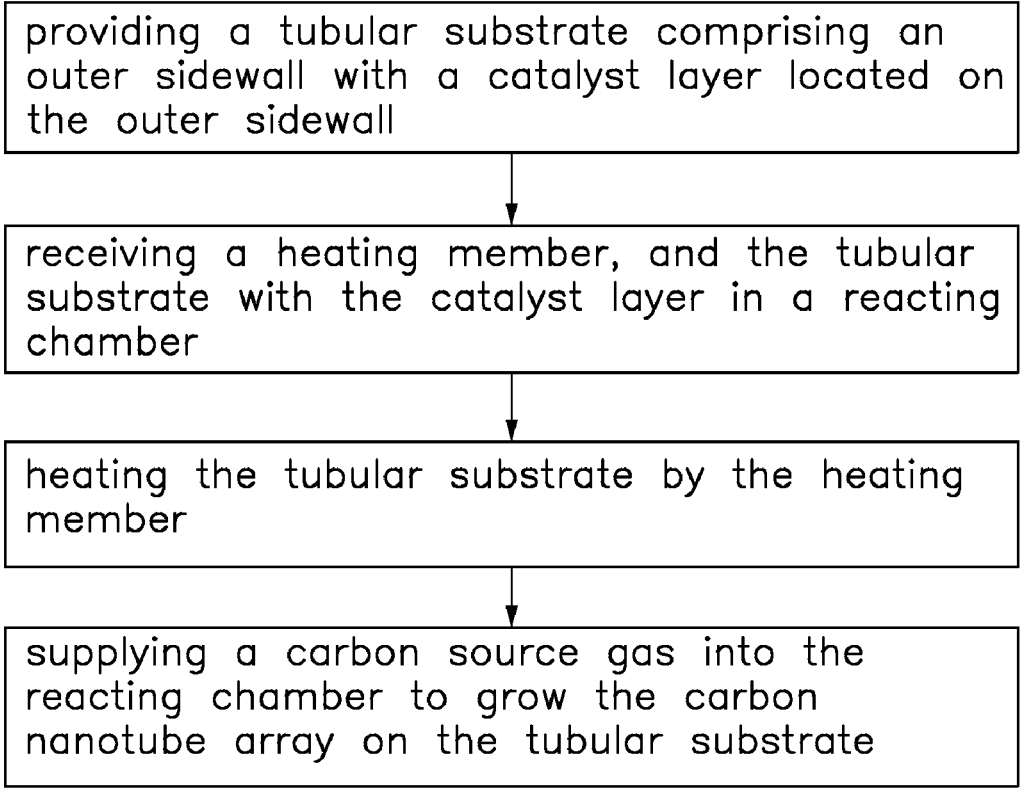
FIG. 1 is a flow chart of an embodiment of a method for forming a carbon nanotube array.
Figure 2:
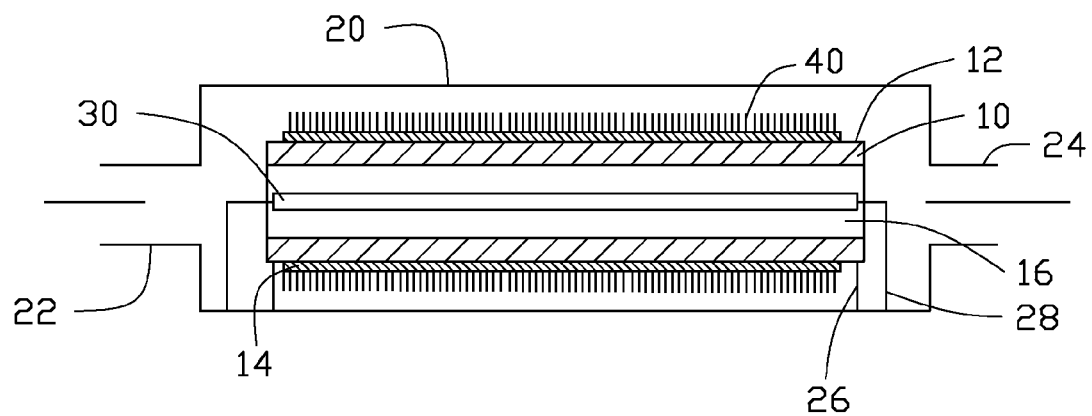
FIG. 2 is a schematic structural view of an embodiment of an apparatus for forming the carbon nanotube array.
Figure 3:
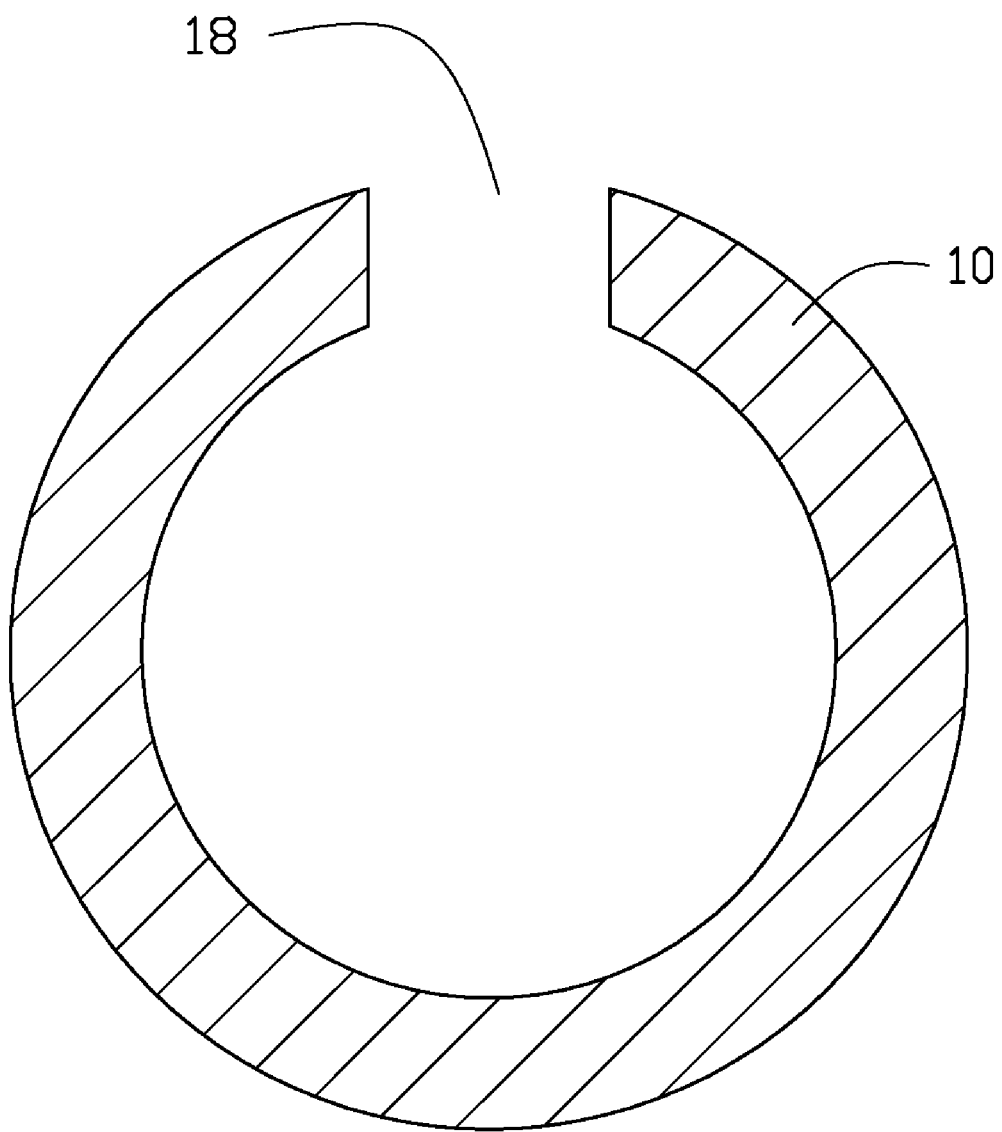
FIG. 3 is a cross sectional view of an embodiment of a tubular structure with a linear shaped opening along an axial direction thereof.

Referring to FIGS. 1-3, an embodiment of a method for forming a carbon nanotube array includes steps of:

S1, providing a tubular substrate 10 including an outer sidewall 12;

S2, forming a catalyst layer 14 on the outer sidewall 12;

S3, receiving a heating member 30, and the tubular substrate 10 with the catalyst layer 14 thereon in a reacting chamber 20;

S4, heating the tubular substrate 10 by the heating member 30; and

S5, supplying a carbon source gas into the reacting chamber 20 to grow the carbon nanotube array 40 on the tubular substrate 10.

The tubular substrate 10 can have a shape of hollow tube defining a through hole 16 therein. The tubular substrate 10 can have two openings connected to the through hole 16 at two opposite ends along a length direction thereof.

A profile of the cross section of the through hole 16 can be round, oval, triangle, rectangle, pentagon, hexagon, or other regular or irregular polygons. The tubular substrate 10 has the outer sidewall 12 and an inner sidewall opposite to the outer sidewall 12. The tubular substrate 10 can also define a linear shaped opening 18 parallel to the length direction thereof on the tubular substrate 10, and extended through the entire length of the tubular substrate 10. The width of the linear shaped opening 18 can be set as desired. In one embodiment, the linear shaped opening 18 can have the width capable of allowing the heating member 30 to pass through the linear shaped opening 18 into the through hole 16.

The tubular substrate 10 can have a round-annular cross section, C shaped cross section, rectangle-annular cross section, rectangle-annular cross section with an opening 18 and/or four rounding corners, oval-annular cross section, or polygon-annular cross section.

The tubular substrate 10 can bear the annealing temperature and growing temperature during the growing of the carbon nanotube array. The material of the tubular substrate 10 can be quartz, ceramic, high temperature glass, P-type silicon, N-type silicon, or metals with high melting points. In one embodiment, the outer sidewall 12 of the tubular substrate 10 can include a silicon dioxide layer. In one embodiment, the tubular substrate 10 is a quartz tube with a smooth outer sidewall 12 and the round-annular cross section. The carbon nanotube array 40 grown on the smooth outer sidewall 12 can be super aligned.

The catalyst layer 14 can be made of iron (Fe), cobalt (Co), nickel (Ni), or any alloy thereof. The catalyst layer 14 can be formed by ion plating, depositing, sputtering, or evaporating a metal layer on the outer sidewall 12. A thickness of the catalyst layer 14 is determined by actual needs. In one embodiment, the thickness of the catalyst layer 14 is about 1 nanometer to about 10 nanometers. In one embodiment, the catalyst layer 14 is a Fe layer with a thickness of 5 nanometers.

The metal layer can be further annealed to form a plurality of nano sized catalyst grains on the outer sidewall 12. An oxidization of metal is occurred during the annealing step, and the metal film is converted to metal oxide of the catalyst grains. The diameter of the catalyst grains can decide the diameter of the carbon nanotubes grown thereon. In one embodiment, the metal layer is annealed at a temperature in an approximate range from 300° C. to 900° C. (e.g., 700° C.) in air for about 30 minutes to about 90 minutes.

In step S3, the reacting chamber 20 includes a gas inlet 22 and a gas outlet 24 respectively located on two opposite ends of the reacting chamber 20. The gas inlet 22 is configured for introducing a carbon source gas and a protective gas into the reacting chamber 20, thus producing carbon atoms for growing the carbon nanotubes. The gas outlet 24 is configured for allowing an exhaust gas to be evacuated/discharged therefrom. The gas inlet 22 and the gas outlet 24 can be located at opposite sidewalls of the reacting chamber 20, and the carbon source gas and the protective gas can flow from the gas inlet 22 to the gas outlet 24 along a direct path, and thus the exhaust gas can be discharged timely. The reacting chamber 20 may be made of a material with a high temperature resistance and chemically stable performance. For example, the reacting chamber 20 may be made of quartz, ceramic, stainless steel or the like.

In one embodiment, the reacting chamber 20 is a quartz tube furnace, and the gas inlet 22 and the gas outlet 24 are located along an axial direction of the tube furnace on the two opposite ends thereof. Further, a bracket 26 can be used to support and fix the tubular substrate 10 and the heating member 30 in the reacting chamber 20, thereby suspending the tubular substrate 10 and the heating member 30 in the reacting chamber 20.

The tubular substrate 10 can be disposed in the reacting chamber 20 along the direction from the gas inlet 22 to the gas outlet 24 (i.e., the through hole extends along the direction from the gas inlet 22 to the gas outlet 24). When the reacting chamber 20 is the tube furnace, the tubular substrate 10 can be disposed in the tube furnace with the through hole 16 of the tubular substrate 10 substantially extending along the axial direction of the tube furnace, to avoid a block of the gas introduced into the reacting chamber 20 from the gas inlet 22. The gas can directly flow through the through hole 16 from the gas inlet 22 to the gas outlet 24. Further, the tubular substrate 10 can use the interspace of the reacting chamber 20 more effectively, than a flat substrate, to increase the growing surface of the carbon nanotube array that can be accommodated in the reacting chamber 20. In one embodiment, the tubular substrate 10 and the reacting chamber 20 with the same profile of cross section perpendicular to the length direction thereof can be coaxially arranged with each other.

The heating member 30 can be disposed in the through hole 16 of the tubular substrate 10 to evenly heating the entire tubular substrate 10 from inside of the tubular substrate 10. The size of the heating member 30 can be determined by the size of the through hole 16. In one embodiment, the heating member 30 can have a linear shape and can be disposed at a center of the through hole 16 along the length direction of the through hole 16. The heating member 30 can be insert into the through hole 16 from the opening at the end of the tubular substrate 10. In one embodiment, the tubular substrate 10 includes the linear shaped opening 18 along the length direction thereof, and the heating member 30 can be inserted into the through hole 16 via the linear shaped opening 18. The heating member 30 can be a resistance rod or infrared lamp tube. In one embodiment, the heating member 30 is located along the axis of the tubular substrate 10.

It can be understood that the atmosphere in the reacting chamber 20 can be displaced from the reacting chamber 20 and/or controlled to avoid unnecessary reaction during the growing of the carbon nanotubes. The air can be discharged by a method such as directly vacuuming the reacting chamber 20, introducing protective gas into the reacting chamber 20 from the gas inlet 22 for a period of time to remove the air from the gas outlet 24, and combinations thereof. A gas pressure of the reacting chamber 20 can be maintained by introducing the protecting gas. The protective gas can be made up of at least one of nitrogen ($N_2$) and a noble gas.

In step S4, the tubular substrate 10 can be heated, by the heating member 30 in the through hole 16, to a growing temperature of the carbon nanotubes. In one embodiment, the growing temperature can be in a range from about 500° C. to about 800° C.

In step S5, the carbon source gas can be a hydrocarbon gas, such as ethylene ($C_2H_4$), methane ($CH_4$), acetylene ($C_2H_2$), ethane ($C_2H6$), or any combination thereof. The carbon source gas can be supplied for about 10 minutes to 2 hours to grow the carbon nanotube array 40 from the outer sidewall 12 of the substrate 10.

More specifically, the carbon source gas and the protective gas can be introduced into the reacting chamber 20 simultaneously in a set ratio and flowing speed from the gas inlet 22 and discharged from the gas outlet 24. The flowing speed of the carbon source gas and the protective gas can be adjusted to keep the volume ratio of the protective gas to the carbon source gas in a range from about 10:1 to about 1:10 in the reacting chamber 20. When the diameter of the tube furnace used as the reacting chamber 20 is about 4 inches to 6 inches, the flowing speed of the protective gas can be in a range from about 200 standard cubic centimeters minute (sccm) to about 500 sccm, and the flowing speed of the carbon source gas can be in a range from about 20 sccm to about 60 sccm. In one embodiment, the tube furnace has a diameter of about 4 inches, the protective gas has a flowing speed of about 360 sccm, and the carbon source gas has a flowing speed of about 40 sccm.

Further, the reacting chamber 20 can also be heated by a heating device (not shown) located outside the reacting chamber 20. In another embodiment, the reacting chamber 20 itself can heat the inside space thereof. Therefore, the tubular substrate 10 can be heated by the heating member 30 from inside of the tubular substrate 10 and/or by heating from outside of the tubular substrate 10.

Referring to FIG. 2 and FIG. 3, a carbon nanotube growing apparatus for growing the above described carbon nanotube array 40 includes the reacting chamber 20, the tubular substrate 10 horizontally disposed in the reacting chamber 20, and the heating member 30 disposed in the through hole 16 defined inside the tubular substrate 10. The reacting chamber 20 includes the gas inlet 22 and the gas outlet 24. The carbon nanotube array growing apparatus can further include a bracket 26 to support the tubular substrate 10 and the heating member 30. The tubular substrate 10 can further define the linear shaped opening 18 along the length direction of the tubular substrate 10.

In another embodiment, the carbon nanotube array growing apparatus for growing the above described carbon nanotube array 40 can include the reacting chamber 20 with the heating member 30 secured therein. The tubular substrate 10 can be slid on and secured by the heating member 30.

The carbon nanotube array 40 can be grown on the entire area of the outer sidewall 12 of the tubular substrate 10, and can have a tubular shape corresponding to the outer sidewall 12 of the tubular substrate 10. The carbon nanotubes of the tubular carbon nanotube array 40 can be selected from single-walled, double-walled, and/or multi-walled carbon nanotubes. Diameters of the single-walled carbon nanotubes approximately range from 0.5 nanometers (nm) to 50 nm. Diameters of the double-walled carbon nanotubes approximately range from 1 nm to 50 nm. Diameters of the multi-walled carbon nanotubes approximately range from about 1.5 nm to about 50 nm. The height of the carbon nanotubes can be approximately 2 microns to approximately 10 millimeters. In one embodiment, the height of the carbon nanotubes can range from about 100 microns to about 900 microns.

In one embodiment, the tubular carbon nanotube array 40 is a super aligned carbon nanotube array and includes a plurality of carbon nanotubes substantially perpendicular to the outer sidewall 12 of the tubular substrate 10. The super aligned carbon nanotube array 120 is essentially free of impurities such as carbonaceous or residual catalyst particles. The carbon nanotubes in the super aligned carbon nanotube array 40 are closely packed together by van der Waals attractive force. Accordingly, a free-standing carbon nanotube film or wire can be drawn from the super aligned carbon nanotube array 40. The tubular substrate 10 can have the larger surface area that can be used to grow the carbon nanotube array thereon than the flat substrate, and efficiently use the space in the reacting chamber 20, accordingly the larger sized carbon nanotube array 40 can be formed.

The heating member 30 is used for heating the tubular substrate 10 from inside of the tubular substrate 10. The heat generated from the heating member 30 located inside the tubular substrate 10 can directly reach the tubular substrate 10 without transmitting through the grown carbon nanotubes. Therefore, the heat can be first used to heat the tubular substrate 10, and the absorption of the heat by the carbon nanotubes can be avoided. This will increase the heating speed of the tubular substrate 10 and the growing speed of the carbon nanotubes. Additionally, by using the heating member 30, the tubular substrate 10 can be evenly heated, and the heating speed of the tubular substrate 10 can be easily controlled by the heating member 30, to control the growing speed of the carbon nanotubes.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for forming a carbon nanotube array, the method comprising:
    providing a tubular substrate comprising an outer sidewall with a catalyst layer located on the outer sidewall, the tubular substrate defining a through hole therein;
    disposing the tubular substrate with the catalyst layer in a reacting chamber;
    arranging a heating member in the through hole of the tubular substrate;
    heating the tubular substrate by the heating member; and
    supplying a carbon source gas into the reacting chamber.

2. The method of claim 1, further comprising a step of introducing a protective gas into the reacting chamber to maintain a gas pressure in the reacting chamber.

3. The method of claim 2, wherein the protective gas displaces air in the reacting chamber before supplying the carbon source gas.

4. The method of claim 1, wherein the tubular substrate is heated to a temperature in a range from about 500° C. to about 800° C.

5. The method of claim 1, wherein the reacting chamber comprises a gas inlet and a gas outlet, the through hole of the tubular substrate extends along a direction from the gas inlet to the gas outlet.

6. The method of claim 5, wherein the reacting chamber comprises an axis, and the through hole extends along the axis of the reacting chamber.

7. The method of claim 6, wherein a shape of a cross section of the through hole is round, oval, triangle, rectangle, pentagon, hexagon, or polygons.

8. The method of claim 1, wherein the tubular substrate comprises an axis, and the heating member is located at the axis of the tubular substrate.

9. The method of claim 8, wherein the heating member has a linear shape.

10. The method of claim 1, wherein the catalyst layer is formed by annealing a metal film to form a plurality of nano sized catalyst grains.

11. An apparatus for forming carbon nanotube array comprising:
    a reacting chamber comprising a gas inlet and a gas outlet;
    a tubular substrate disposed in the reacting chamber, the tubular substrate defining a through hole therein; and
    a heating member located in the through hole of the tubular substrate in the reacting chamber.

12. The apparatus of claim 11, wherein the tubular substrate defines two openings at two opposite ends of the tubular substrate.

13. The apparatus of claim 12, wherein the tubular substrate defines a line shaped opening parallel to a longitudinal direction of the tubular substrate capable of allowing the heating member to slide therethrough.

14. The apparatus of claim 12, wherein the through hole extends along a direction from the gas inlet to the gas outlet.

15. The apparatus of claim 12, wherein a shape of a cross section of the through hole is round, oval, triangle, rectangle, pentagon, hexagon, or polygons.

16. The apparatus of claim 11, wherein the heating member has a linear shape, the tubular substrate comprises an axis, and the heating member is located at the axis of the tubular substrate.

17. The apparatus of claim 16, wherein the heating member is an infrared lamp tube.

18. The apparatus of claim 11 further comprising a bracket disposed in the reacting chamber to support and fix the tubular substrate and the heating member.

19. A method for forming a carbon nanotube array, the method comprising:
providing an apparatus comprising:
a reacting chamber comprising a gas inlet and a gas outlet,
a tubular substrate disposed in the reacting chamber, the tubular substrate defining a through hole therein, and
a heating member located in the through hole of the tubular substrate in the reacting chamber,
wherein the tubular substrate comprises an outer sidewall with a catalyst layer located on the outer sidewall;
heating the tubular substrate by the heating member;
supplying a carbon source gas into the reacting chamber; and
growing the carbon nanotube array on the outer sidewall of the tubular substrate.

20. The method of claim 19, wherein the tubular structure defines a linear shaped opening, the linear shaped opening is parallel to a length direction of the tubular structure, and the tubular structure comprises a C-shaped cross section, the linear shaped opening has a width capable of allowing the heating member to pass through the linear shaped opening into the through hole.

* * * * *